United States Patent [19]

McFarlane

[11] Patent Number: 4,651,951

[45] Date of Patent: Mar. 24, 1987

[54] APPARATUS FOR THE REMOVAL OF HELMET-MOUNTED EQUIPMENT

[75] Inventor: Robert J. McFarlane, Lothian, Scotland

[73] Assignee: Ferranti Plc, Cheshire, England

[21] Appl. No.: 751,378

[22] Filed: Jul. 3, 1985

[30] Foreign Application Priority Data

Jul. 4, 1984 [GB] United Kingdom ............... 8417031

[51] Int. Cl.⁴ .............................................. B64D 25/00
[52] U.S. Cl. ............................ 244/1 R; 244/122 AG; 33/262; 350/547
[58] Field of Search ............... 244/122 R, 121, 122 A, 244/122 AE, 122 AG, 122 B; 33/262, 252, 263; 350/547, 549, 145, 638; 2/6, 422; 128/207.11, 206.27, 206.21

[56] References Cited

U.S. PATENT DOCUMENTS

| | | | |
|---|---|---|---|
| 2,649,019 | 8/1953 | Hartline et al. | 350/547 |
| 2,693,326 | 11/1954 | Lobelle | 244/122 AE |
| 2,820,602 | 1/1958 | Foster | 244/122 AE |
| 2,836,382 | 5/1958 | Martin | 244/122 AG |
| 3,051,047 | 8/1962 | Fieux | 33/262 |
| 4,156,292 | 5/1979 | Helm et al. | 350/145 |
| 4,486,955 | 12/1984 | Fisher et al. | 33/262 |

FOREIGN PATENT DOCUMENTS 792605 8/1968 Canada ........................... 244/122 B Primary Examiner—Galen Barefoot
Attorney, Agent, or Firm—Kerkam, Stowell, Kondracki & Clarke

[57] ABSTRACT

Apparatus for detaching helmet-mounted equipment (6) from the helmet (4) of a vehicle-mounted user (1) includes a quick-release fastening (8) securing the equipment to the helmet. A removal cord (11) passes from the equipment by way of a guide (10) and is attached to the vehicle (12). The action of the apparatus is to remove the equipment from the helmet to a position of safety when the user has to leave the vehicle in an emergency.

18 Claims, 10 Drawing Figures

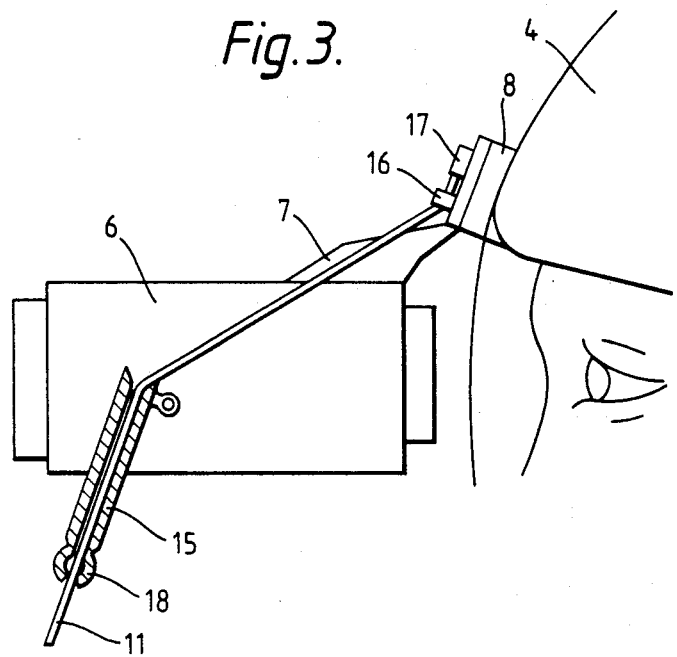
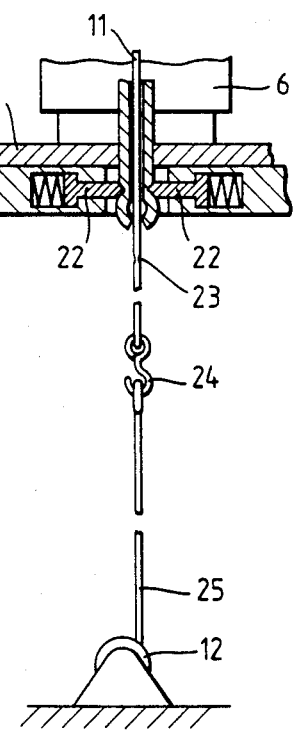

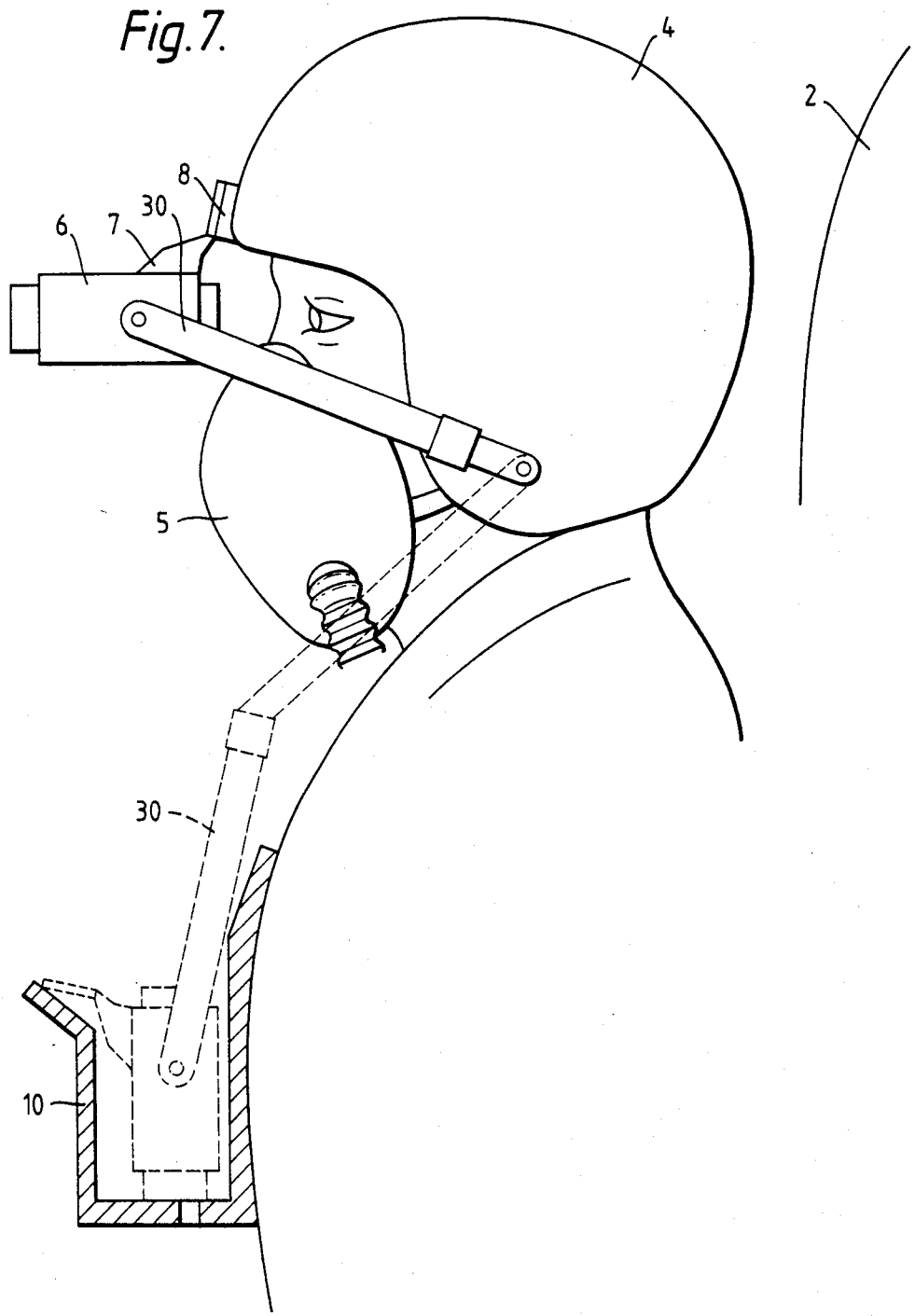

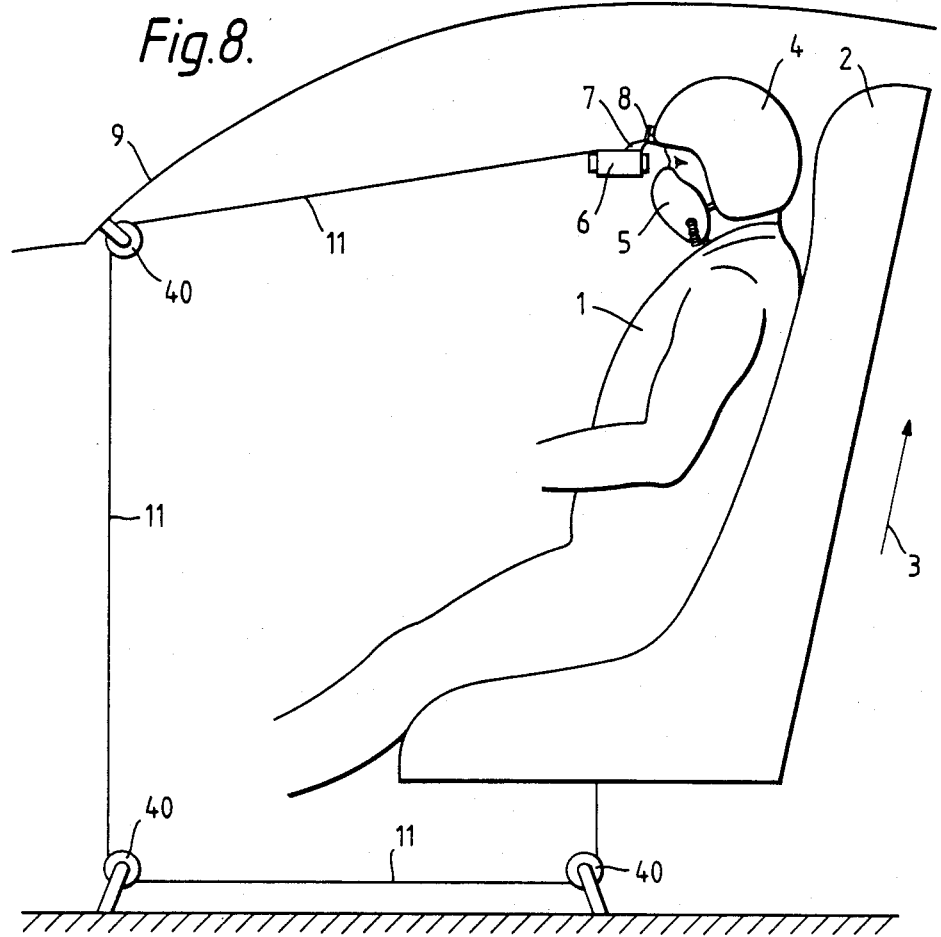
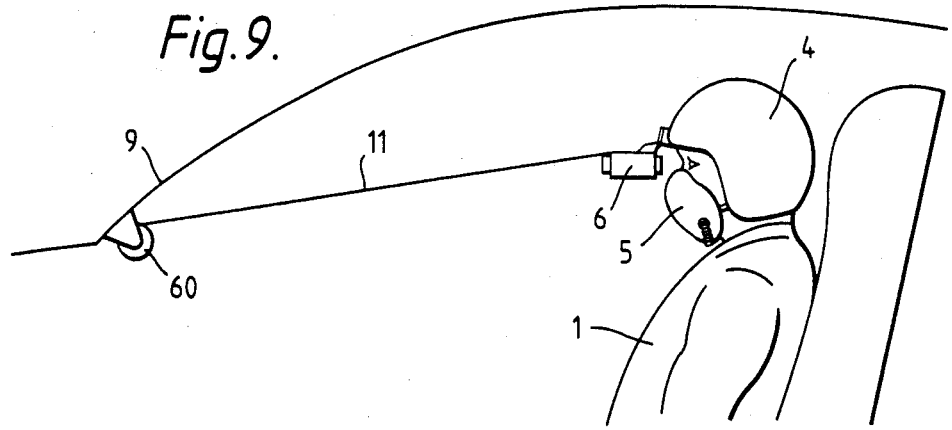

APPARATUS FOR THE REMOVAL OF HELMET-MOUNTED EQUIPMENT

Helmet-mounted equipment is becoming increasingly common in aircraft and other vehicles, usually in a military situation. The best-known example is the helmet-mounted head-up display in which the essential components are mounted on a pilot's helmet instead of being attached to the aircraft itself. A great deal of effort has gone into the design of such equipment, with a view of ensuring that the equipment is light and compact and will not inconvenience the user in any situation. Particularly important to the pilot of a fixed-wing aircraft is the need to ensure that such helmet-mounted equipment will not interfere with, nor present a hazard, to the pilot should he have to eject from his aircraft in an emergency. These same provisions apply equally to other crew members of an aircraft, and could also apply to crew members in rotary-wing aircraft or to personnel in vehicles who may have to effect an emergency evacuation.

Helmet-mounted equipment of other types is now being used, such as night-vision aids or weapon-aiming devices, and these tend to be too large to retain on the helmet in an emergency. However, particularly in a single-manned fixed wing aircraft it is not possible simply to discard such equipment in an emergency as it may still represent a hazard to the pilot in an emergency.

It is an object of the present invention to provide apparartus for safely detaching helmet-mounted equipment from the helmet of a vehicle-mounted user, particularly though not exclusively in an emergency situation.

According to the present invention there is provided apparatus for detaching helmet-mounted equipment from the helmet of a vehicle-mounted user which includes a quick-release mechanism for detachably securing the equipment to the helmet, a removal cord attached to the equipment and to the vehicle and arranged to permit normal movements of the equipment when attached to the helmet, and guide means located so as to control the movement of the equipment subsequent to its detachment from the helmet.

The term "cord" is used to indicate any suitable form of flexible but substantially non-extensible member. It may be made of natural or artificial fibres or metal, and could be in the form of a strap rather than having the circular cross-section normally implied by the term "cord".

The invention will now be described with reference to the accompanying drawings, in which:

FIGS. 3, 4 and 5 illustrate further features of the embodiment of FIG. 2;

FIG. 7 is a further variation of the embodiment of FIG. 2;

FIG. 8 illustrates the basic features of a second embodiment of the invention;

FIG. 9 shows a modification of the embodiment of FIG. 8; and

Figure 1:
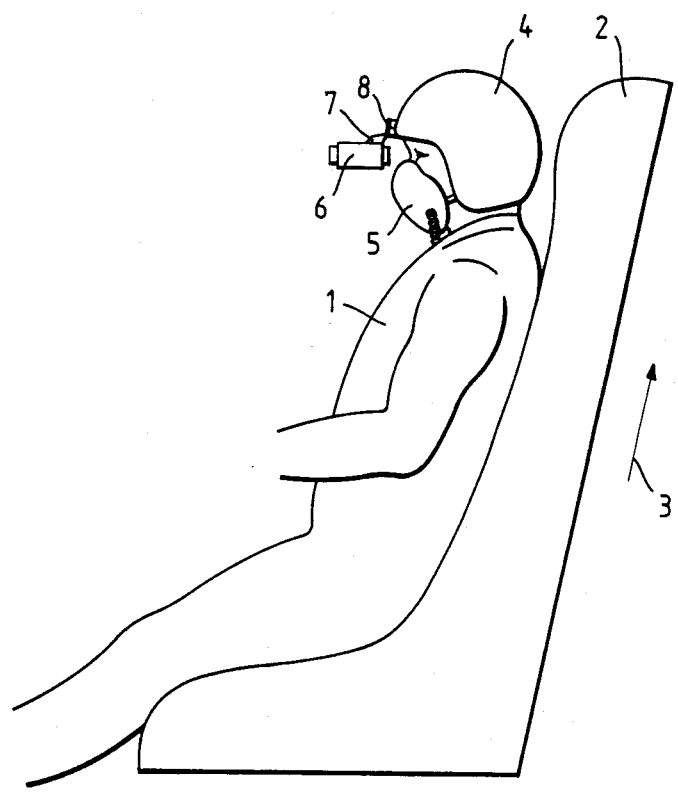
FIG. 1 is a diagram illustrating the use of helmet-mounted equipment in an aircraft.

Referring now to FIG. 1, this shows a crew member 1 in an aircraft sitting on a standard ejection seat 2. When activated the seat moves in the direction of the arrow 3. The crew member is shown wearing the standard helmet 4 and mask 5. Attached to the helmet is a piece of equipment such as night-vision goggles 6 which are supported by a mounting arm 7 carrying a quick-release fastening which cooperates with a mounting socket 8 secured to the helmet 4. Whilst the goggles 6 are in use they are supported by the helmet 4. However they must clearly be removable when not required by the user, and must also be automatically detachable in the event of operation of the ejection seat without any action being necessary on the part of the user.

Figure 2:
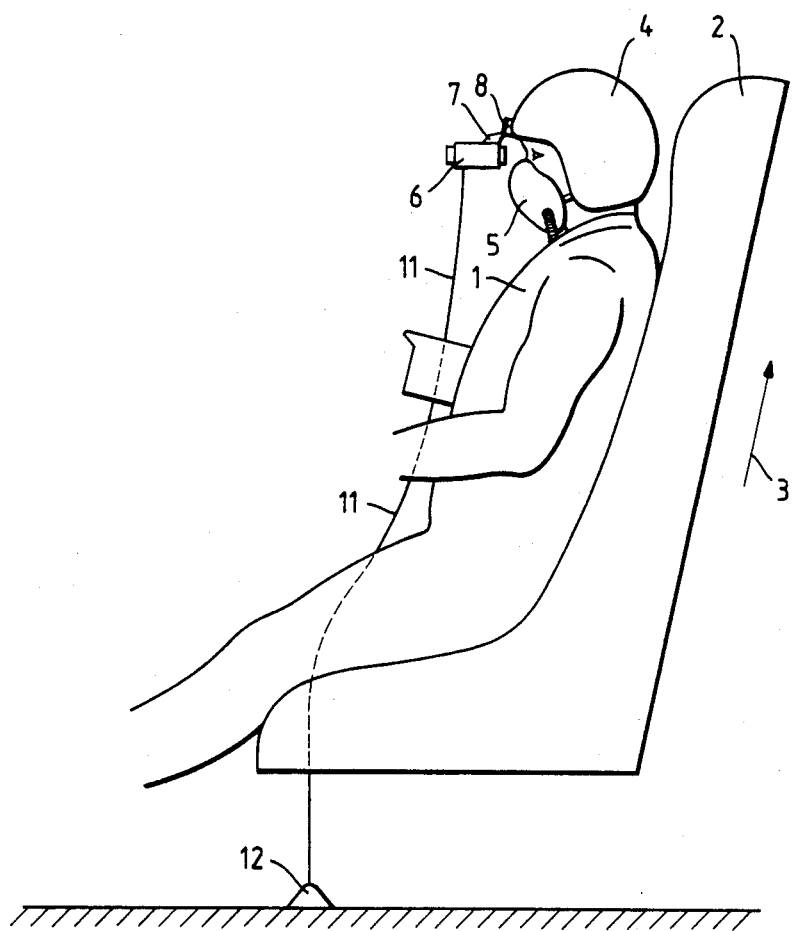
FIG. 2 is a similar diagram illustrating one basic embodiment of the invention.
Figure 5:
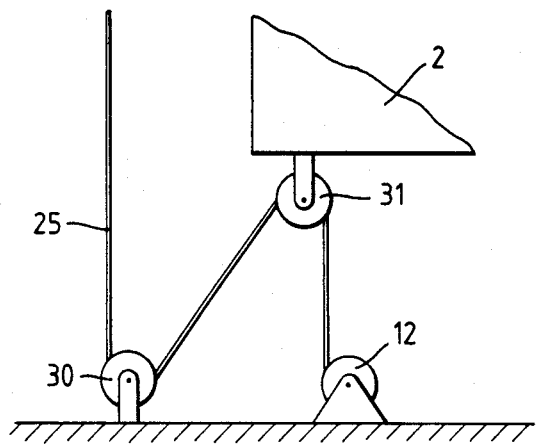

FIG. 2 shows the basic features of one embodiment of the invention. Carried on the chest of the crew member 1 is a receptacle in the form of a pouch 10 arranged to receive the goggles 6. A removal cord 11 is attached at one end to the quick-release fastening on mounting arm 7 and passes over a guide on the goggles 6, through the base of the pouch 10 onto a tensioning device 12 fastened to the floor of the aircraft.

The operation of this basic embodiment is as follows:

The user is free to move in a normal manner, such movement being restrained to a considerable extent by the harness securing the user to the seat. The goggles may be removed manually by the user and placed in the pouch, slack in the cord being taken up by the tensioning device 12. Similarly the goggles may be removed from the pouch and attached to the helmet by the user, leaving the users hands free.

If the ejection seat has to be used in an emergency the upward movement of the seat initially extends the cord 11 to the limit allowed by the tensioning device 12. If the goggles 6 are attached to the helmet 4 then this extension will be small. When the cord is fully extended tension in it will release the quick-release fastening securing the goggles 6 to the helmet 4, detaching the goggles which will be pulled down into the pouch 10. The cord is arranged so that when the goggles are in place in the pouch further tension on the cord will cause it to break, thus removing the connection between the user and the aircraft. At the same time main the oxygen supply, radio and other connections will be broken as the ejection seat leaves the aircraft.

If the goggles are already stowed in the pouch when ejection occurs the same procedure is followed except that the cord extends until it is broken.

Clearly there are a number of necessary features which are not shown in FIG. 2, and FIGS. 3, 4 and 5 illustrate some of these. FIG. 3 shows details of the attachment of the goggles 6 to the helmet 4. The cord 11 passes through a guide sleeve 15 which is pivotally attached to the goggles, and onto the quick-release fastener supported by the arm 7. The cord passes through a guide 16 on the fastener and is attached to a spring-loaded latch 17. Many types of quick-release fastener are known, and hence no further details will be given. The lower end of the guide sleeve 15 is formed into a retaining member 18, as will be described below.

It is necessary in many cases to provide some means of retaining the goggles in the pouch when they are stowed there. This is particularly advisable in military aircraft since these may perform violet manoeuvres which could dislodge the goggles from the pouch. FIG. 4 illustrates one way in which this may be done and also shows the essential features of the attachment of the cord 11 to the aircraft. FIG. 4 shows part of the base of the pouch 10 with the goggles stowed. The base 20 of the pouch has a padded upper surface 21 to avoid damage to the goggles when they are being stowed. Through the base 20 and padding 21 is a hole through which the cord 11 passes. Two spring-loaded retaining pins 22 are carried by the base 20 of the pouch and engage in recesses in the retaining member 18 when the goggles are stowed. The retaining member 18 and retaining pins 22 are arranged so that the goggles may be removed from the pouch by the user, but will normally be held in the pouch even when manoeuvres are being performed. Also as shown in FIG. 4 the cord may be provided with a weak portion 23 which will break when sufficient force is exerted on it. This weak portion is located below the retaining member 18.

Some part of the cord must include a link by means of which the goggles may be released from the aircraft when the user leaves in the normal manner. As shown in FIG. 4 this may take the form of a snap link 24 which attaches the upper part of cord 11 to the lower or anchor portion 25. This latter portion is attached to the tensioning device 12 mounted on the floor of the aircraft. When entering the aircraft thereof, the crew member will extend the lower portion 25 of the cord against the action of the tensioning device 12 and will attach the upper portion of the cord by means of the snap link 24. The reverse procedure is adopted when leaving the aircraft in the normal manner.

It is possible to remove the goggles from the helmet more rapidly during ejection by mounting a first pulley 30 on the floor of the aircraft and a second pulley 31 on the underside of seat 2. The tensioning device 12 is mounted on the floor as before. This arrangement gives a more rapid movement of the cord attached to the goggles as the ejection seat moves upwards.

Figure 6:
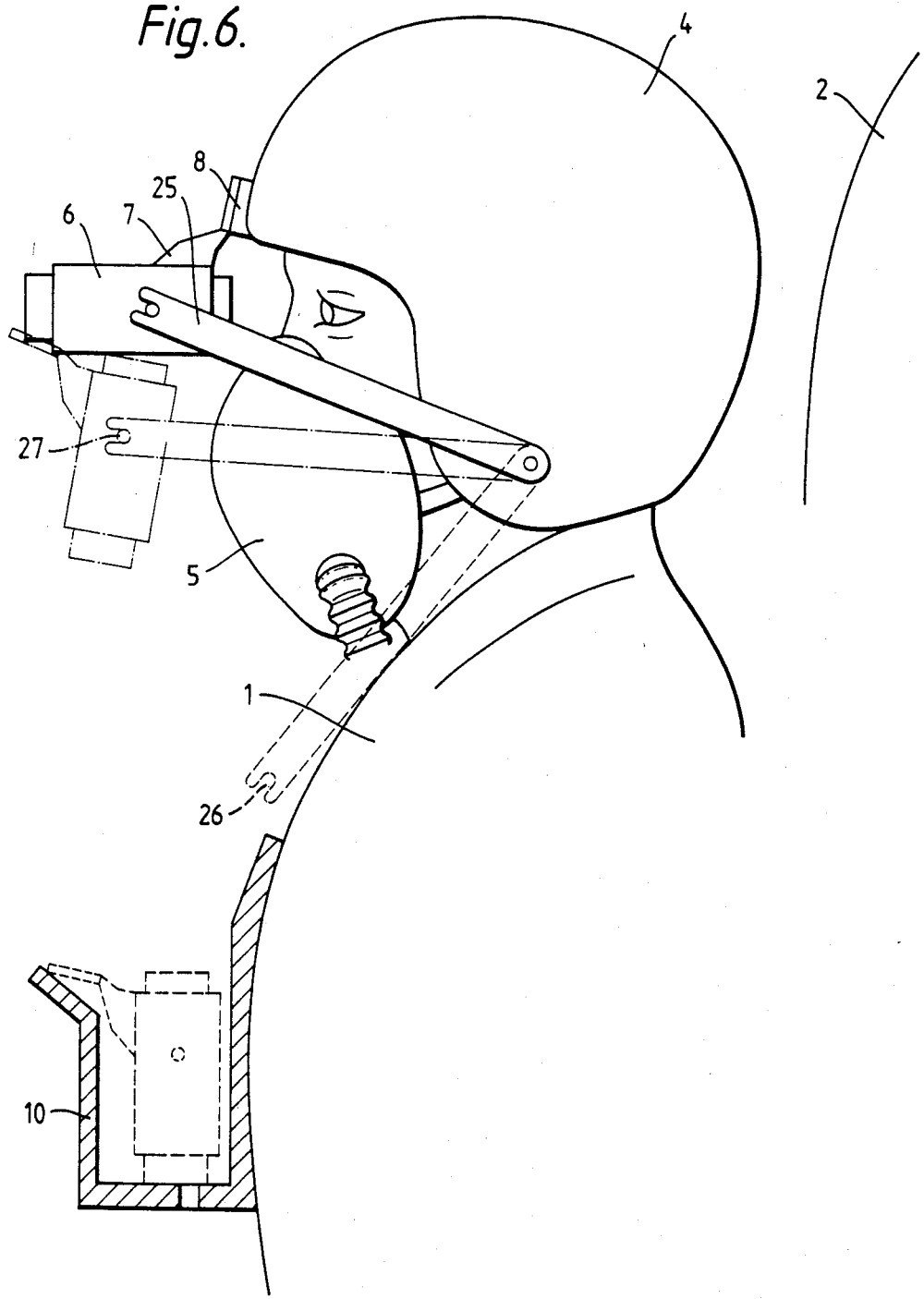
FIG. 6 illustrates a further modification to the embodiment of FIG. 2.

A possible problem which still exists with the apparatus described above is that of ensuring that the goggles clear the crew member's face and mask as they are removed. It may be possible to fit a spring inside the quick-release fastening so that the goggles are pushed forwards as the fastening is released. An alternative arrangement is shown in FIG. 6 and includes a pair of arms 25, one on each side of the helmet 4 and pivoted on the helmet. The free end of each arm 25 has an open-ended slot 26 which is arranged to engage a pin 27 on the goggles.

FIG. 6 shows the goggles in three different positions. The cord has been omitted for clarity. The full lines show the goggles 6 mounted on the helmet 4 as before, with the pins 27 on the goggles fully engaged in the slots 26 in arms 25. The chain-dotted outline in FIG. 6 shows the position of the goggles soon after the quick-release fastening has been released. The tension in the cord has caused the goggles 6 to rotate, but since the goggles are still supported by arms 25 there is no risk of the goggles striking the crew member's face or mask.

Finally, the dotted outline shows the final position of the goggles, located in the pouch 10. As the goggles and arms 25 continued to move downwards the pins 27 left the slots 26, allowing the goggles to fall freely into the pouch.

When the goggles are removed from the pouch 10 for use, the pins 27 have first to be engaged in the slots 26 in the ends of arms 25. This may cause some difficulty, and the arrangement of FIG. 7 is an alternative arrangement which overcomes this problem. In this, as shown in FIG. 7, the arms 25 of FIG. 6 are replaced by telescopic arms 30 which are permanently attached to both the helmet 4 and the goggles 6. The Figure shows the goggles attached to the helmet in full outline, in which position the arms 30 are at their shortest length. When the goggles are released they swing on arms 30 as before whilst at the same time the arms extend to deposit the goggles into the pouch. Again the cord is not shown for clarity, but this guides the goggles into the pouch.

The problem with the arrangement described is that the goggles will restrict movement of the crew member's head when they are stowed in the pouch, due to the connection of the arms 30. On the other hand the crew member has no problem when attaching the goggles to his helmet such as is possible with the arrangement of FIG. 6.

The apparatus described above is concerned with the safe removal of any form of helmet-mounted equipment which should be detached from the helmet prior to ejection from the aircraft. Many aircraft however, particularly rotary-wing types, are not fitted with ejector seats. It will be seen however that apart from the modification shown in FIG. 5 the arrangements will work equally well if the user of the equipment leaves his seat in order to leave the aircraft. The cord will be extended to the limit allowed by the tensioning device, the goggles or other equipment will be stowed in the pouch and the cord will break, leaving the user free to move further from the seat. The same applies to users located in land vehicles or even ships.

If it is not necessary to retain the goggles once they have been removed from the helmet then the pouch 10 becomes unnecessary. It will, however, be necessary to provide some protection for the crew member since the goggles will fall onto his lap as ejection takes place. Clearly if the pouch is not used then the guide arms of FIG. 7 are of no use, and the arrangement of FIG. 6 is perhaps more satisfactory.

It may be preferable in some instances simply to move the goggles or other helmet-mounted equipment away from the crew member when ejection or other emergency movement is intended. However, some restraint on the movement of the equipment is necessary to prevent danger to the crew member. A pair of night-vision goggles moving freely about the cockpit of a fast-moving aircraft could represent a considerable hazard. The embodiment to be described supposes that the equipment is always required to be mounted on the crew member's helmet during a flight and is not likely to be removed except in an emergency. In such a case it is not necessary for the equipment to be stowed in a place which is accessible to the crew member as in the embodiments described above.

FIG. 8 shows the basic features of the embodiment. As before, a crew member 1 sits in and is secured to a seat 2 which may eject in the direction of the arrow 3. The crew member wears a helmet 4 and oxygen mask 5. Equipment such as night-vision goggles 6 are attached to the helmet by means of a quick-release fastening locating in a socket 8 on the helmet 4. The cockpit canopy 9 is also shown. In this embodiment the cord 11 passes from the quick-release mechanism and goggles over a number of guides 40 and is anchored to the underside of the ejection seat is operated movement of the seat pulls on the cord 11 and detaches the goggles from the helmet and moves them forward away from the crew member. Continued movement of the seat will cause the cord to break, at which time the goggles will be able to move freely within the aircraft. However, the seat and the crew member will have cleared the aircraft by the time this happens and the goggles will not present a hazard to the crew member.

Clearly, as before, a number of other features are necessary in addition to the basic features described. Some form of spring-loaded tensioning device is necessary to accommodate normal movements of the crew member. In addition it may be necessary to provide some form of snap hook to connect the goggles to the cord if the goggles are brought into the aircraft by the crew member. The tensioner for the cord may be an in-line device, thus avoiding the necessity to fasten the tensioner to the floor or seat as would be necessary of the spring-loaded drum described above was used. It is also possible to avoid the goggles being free to move about the cockpit after the user has ejected. This requires, for example, a rotatable drum such as that shown in FIG. 9, fastened to the aircraft in a suitable position.

It is possible to provide apparatus which does not rely on the movement of the ejection seat to remove the goggles or other helmet-mounted equipment. This would avoid the necessity for length of cord extending around the aircraft. In one such arrangement, shown in FIG. 9, the cord 11 passes from the goggles directly to a combined tensioner and winding drum 60. This could be arranged to be activated at the same time as the ejection seat so as to pull the goggles away from the crew member immediately prior to ejection.

Figure 10:
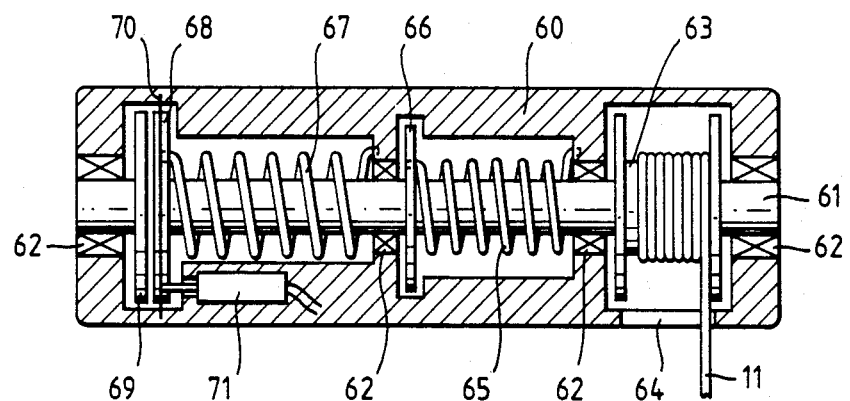
FIG. 10 shows detail of a feature of the embodiment of FIG. 2.

FIG. 10 shows the detail of one possible form of the combined tensioner and winding drum. The drawing is a side view of the device in which only the housing is shown sectioned for clarity, and shows a housing 61 supporting a shaft 62 in bearings 63. The shaft carries a drum 63 onto which is wound the cord 11 which passes through a slot 64 in the housing. The tensioning arrangement comprises a torsion spring 65 wound around part of the shaft 62 and having one end anchored to the housing 62. The other end of the spring 65 is attached to a disc 66 which is keyed to the shaft.

The emergency winding arrangement comprises a second torsion spring 67 which exerts considerably more force than the spring 65. One end of spring 67 is anchored to the housing 61 and the other end is fastened to a disc 68 which is free to rotate on the shaft 62. Located immediately alongside disc 68 and close to it is a drive disc 69 which is keyed to the shaft 62. Some form of clutch mechanism is provided between the adjacent faces of discs 68 and 69. Disc 68 is held by a clamp 70 so that it is unable to rotate although spring 67 is tensioned. A gas actuation 70 is operable electrically to disengage the clamp 70.

In operation, the emergency winding spring 67 is pretensioned and the disc 68 clamped. Tensioning spring 65 is arranged so that it is adequately tensioned when enough cord has been pulled off the drum 63 to connect to the helmet-mounted equipment. Movements of the crew member's head will cause the cord to be wound onto or pulled off the drum 63 under the influence of the spring 65.

In an emergency the actuation of the ejector seat also activates the gas actuator 71. This released the clamp 70 and actuates the clutch mechanism connecting discs 68 and 69. This causes disc 69 and the shaft to be rotated by the energy stored in the spring 67, and winds the cord 11 on to the drum 63, detaching the helmet-mounted equipment and moving it safely away from the crew member. It will be appreciated that other forms of emergency winding arrangement may be used. Equally, other features of the apparatus described may be altered without departing from the essential features of the invention.

What we claim is:

1. Apparatus for detaching helmet-mounted equipment from the helmet of a vehicle-mounted user, which includes a quick-release mechanism for detachably securing the equipment to the helmet, a removal cord attached to the equipment and to the vehicle and arranged to permit normal movements of the equipment when attached to the helmet, and guide means constructed and arranged so as to control the movement of the equipment subsequent to its detachment from the helmet.

2. Apparatus as claimed in claim 1 in which the quick release mechanism is attached to the removal cord so as to be actuated when the tension in the cord exceeds a predetermined value.

3. Apparatus as claimed in claim 2 which includes a tensioning device attached to the removal cord and operable to maintain in the cord a tension below said predetermined value.

4. Apparatus as claimed in claim 3 in which the removal of the equipment is caused by movement of the user relative to the vehicle in excess of a preset distance.

5. Apparatus as claimed in claim 4 in which the said relative movement is caused by movement of a seat carrying the user.

6. Apparatus as claimed in claim 5 in which the end of the cord remote from the equipment is attached to the floor of the vehicle adjacent to the said seat.

7. Apparatus as claimed in claim 6 in which the said end of the cord is attached to the tensioning device which is fastened to the floor of the vehicle.

8. Apparatus as claimed in claim 1 in which the removal cord includes a portion arranged to break when removal of the equipment is completed.

9. Apparatus as claimed in claim 1 in which the removal cord is formed in two portions one of which is attached to the helmet-mounted equipment and includes a detachable link enabling the user to join and separate the two portions of the cord.

10. Apparatus for detaching helmet-mounted equipment from the helmet of a vehicle-mounted user comprising a quick-release mechanism for detachably securing the equipment to the helmet, a removal cord attached to the equipment and to the vehicle and arranged to permit normal movements of the equipment when attached to the helmet, and guide means located so as to control the movement of the equipment subsequent to its detachment from the helmet, said guide means including a receptacle carried by the user and having an aperture through which the removal cord passes between the equipment and the vehicle.

11. Apparatus as claimed in claim 10 in which the equipment carries a retaining member arranged to engage with part of the said receptacle so as to removably retain the equipment in the receptacle.

12. Apparatus as claimed in claim 10 which includes at least one guide arm attached to the helmet and to the equipment and arranged to control the position of the equipment subsequent to its removal from the helmet.

13. Apparatus as claimed in claim 12 in which the guide arms are removably attached to the equipment and become detached therefrom before the equipment is located within the said receptacle.

14. Apparatus as claimed in claim 12 in which the guide arms are permanently attached to the equipment.

15. Apparatus for detaching helmet-mounted equipment from the helmet of a vehicle-mounted user, which includes a quick-release mechanism for detachably securing the equipment to the helmet, a removal cord attached at one end to the equipment and at the other end a tensioning device fastened to the floor of the vehicle and arranged to permit normal movements of the equipment when attached to the helmet, tensioning device attached to the removal cord and operable to maintain in the cord a tension below said predetermined value, and guide means located so as to control the movement of the equipment subsequent to its detachment from the helmet, the quick release mechanism being attached to the removal cord so as to be actuated when the tension in the cord exceeds a predetermined value caused by movement of a seat carrying the user in excess of a preset distance and a guide system positioned in the seat and on the floor and arranged to increase the speed of movement of the equipment when movement of the seat occurs.

16. Apparatus for detaching helmet-mounted equipment from the helmet of a vehicle-mounted user, which includes a quick-release mechanism for detachably securing the equipment the helmet, a removal cord attached to the equipment and to the vehicle and arranged to permit normal movements of the equipment when attached to the helmet, and guide means located so as to control the movement of the equipment subsequent to its detachment from the helmet, the guide means including a winding device secured to the structure of the vehicle and operable to detach the equipment from the helmet and to move the equipment away from the user.

17. Apparatus as claimed in claim 16 in which the winding device includes a drum onto which the cord may be wound and a remotely-controlled actuator for actuating the movement of the drum.

18. Apparatus as claimed in claim 17 in which the winding device includes the tensioning device.

* * * * *